United States Patent [19]

Flax et al.

[11] Patent Number: 4,515,163
[45] Date of Patent: May 7, 1985

[54] METHOD AND A MEANS FOR DETERMINING ULTRASONIC WAVE ATTENUATION IN TISSUE USING ZERO CROSSING DETECTOR FUNCTIONING WITHIN A SPECIFIED FREQUENCY BAND

[75] Inventors: Stephen W. Flax, Waukesha; Norbert J. Pelc, Wauwatosa, both of Wis.

[73] Assignee: General Electric Company, Milwaukee, Wis.

[21] Appl. No.: 585,527

[22] Filed: Mar. 2, 1984

[51] Int. Cl.³ .............................................. A61B 10/00
[52] U.S. Cl. ...................................... 128/660; 73/599
[58] Field of Search ................................ 128/660–663; 73/599, 609; 324/78 D

[56] References Cited

U.S. PATENT DOCUMENTS 4,441,368 4/1984 Flax ........................................ 73/599

Primary Examiner—Kyle L. Howell
Assistant Examiner—Ruth Smith
Attorney, Agent, or Firm—Flehr, Hohbach, Test, Albritton & Herbert

[57] ABSTRACT

A zero crossing detector including timing and logic circuitry for ascertaining and eliminating undesirable waveform characteristics. If a zero crossing indication occurs within a set time period after a trigger event due to a phase inversion or noise, then the indication is ignored. Conversely, if a zero crossing does not occur within a second set time period due to a phase reversal, an artificial crossing will be indicated. By establishing these bounds, the system will function within a specified frequency band.

6 Claims, 5 Drawing Figures

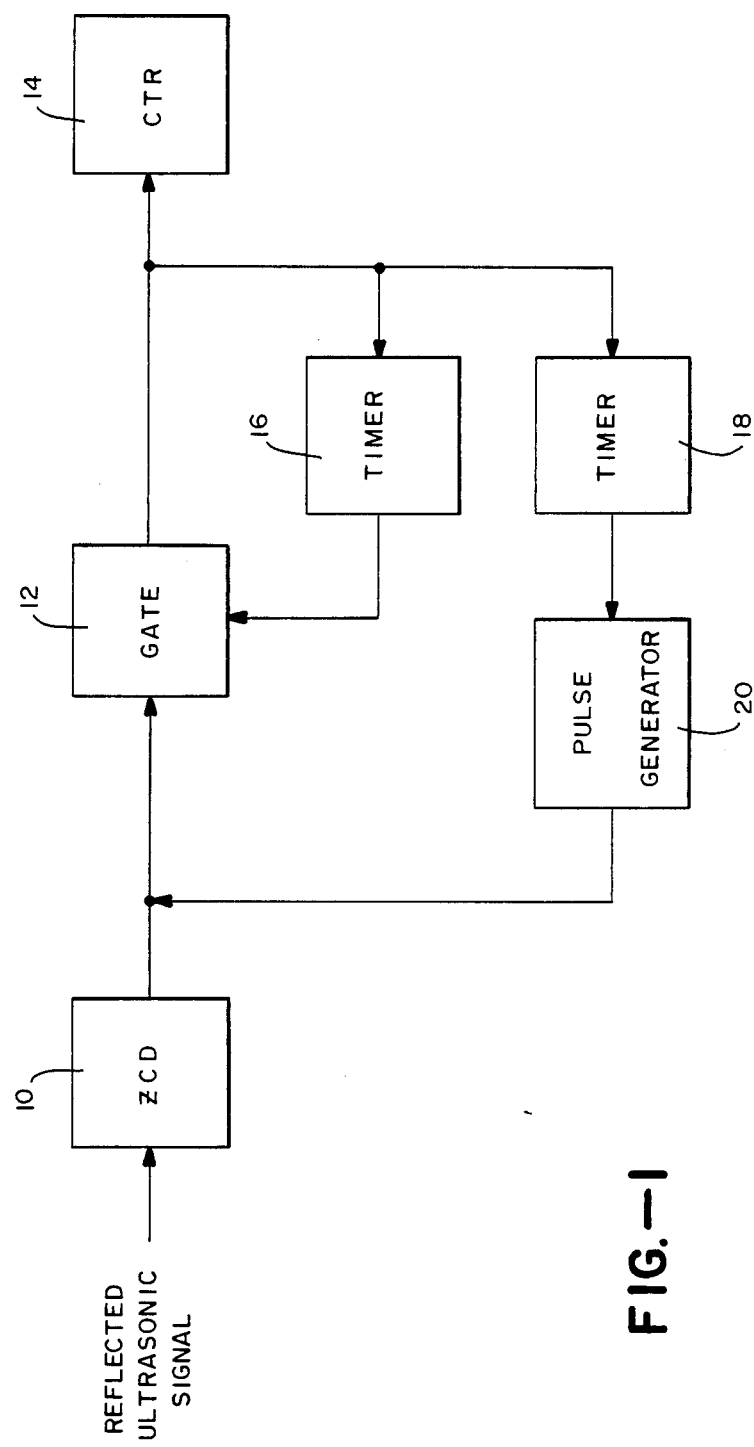
FIG.—1

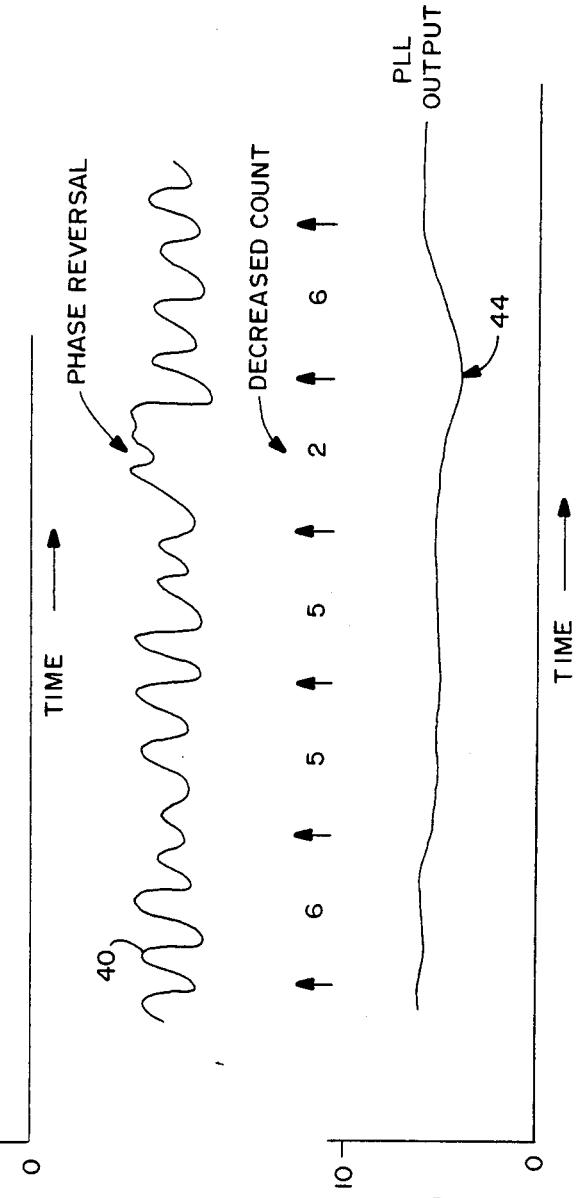

METHOD AND A MEANS FOR DETERMINING ULTRASONIC WAVE ATTENUATION IN TISSUE USING ZERO CROSSING DETECTOR FUNCTIONING WITHIN A SPECIFIED FREQUENCY BAND

This invention relates generally to ultrasonic diagnostic systems, and more particularly the invention relates to a method and means for determining ultrasonic wave attenuation in tissue by frequency analysis.

Ultrasonic diagnostic systems are known and commercially available for medical diagnostic purposes. See for example U.S. Pat. No. 4,172,386 for "Video A-Trace Display System for Ultrasonic Diagnostic System" and U.S. Pat. No. 4,204,433 for "Computerized Ultrasonic Scanner with Technique Select". The commercially available Datason ultrasound system of General Electric Company provides both real time and static images on a television display.

Briefly, such systems utilize sound transducers to transmit ultrasonic waves (e.g. on the order of several megahertz) into a patient and to receive reflected signals. By analyzing the reflected signals a quantitative assessment of physical tissue parameters can be obtained. Such parameters include frequency dependent signal attenuation, speed of sound, signal scatter and refractive effects. While medical diagnosis through ultrasound signal analysis has been successful, physiological variations and sample error problems limit the accuracy of the measurements.

Tissue attenuation of ultrasonic energy in the range of one to ten megahertz is found to be approximately a linear function of frequency and depth and is normally expressed dimensionally in dB/cm/MHz. Different tissues and different lesions within a given tissue tend to have different attenuation coefficients, thus each can be characterized by determining this coefficient.

Heretofore, the attenuation coefficient has been usually measured directly by obtaining a signal sample at two different depths within the tissue and then taking and comparing the Fourier transforms of the signals. Since attenuation is frequency dependent, the amount of attenuation can be inferred from the change in the spectrum of the ultrasonic waveform. Theoretically, the frequency dependence of attenuation can be obtained by dividing one spectrum by the other. In practice, however, the signals obtained from the tissue scatter produce a noisy spectrum and estimation techniques are used. An additional complication is that if a sample is too short the spectral resolution is limited and if the sample is too long a spectral smearing occurs since the spectrum is changing with depth. Thus, the frequency dependent attenuation coefficient for tissue has been a limited and difficult measurement.

Disclosed in copending application Ser. No. 369,423 filed Apr. 19, 1982 is a method and an apparatus for determining tissue attenuation by determining the number of zero crossings of a reflected ultrasonic wave as a function of depth of reflection in the tissue. By comparing the number of zero crossings at one depth to the number of zero crossings at the second depth, a measure of attenuation in the tissue between the first depth and the second depth is obtained.

Disclosed in copending application Ser. No. 520,958 filed Aug. 8, 1983 is a method and an apparatus using a phase locked loop for providing a measure of signal attenuation. A transducer generated signal in response to a reflected ultrasonic wave is applied to one input of a frequency or phase detector. A second input signal is provided by a voltage controlled oscillator. The output of the phase detector is applied as a feedback signal to the voltage control oscillator to control the frequency thereof. By tracking the feedback control voltage, a measure of the mean frequency of the reflected ultrasonic wave, and consequently a measure of tissue attenuation, is obtained. Importantly, the tracking oscillator filters irregular reflections and noise.

The present invention is directed to a method and means for measuring signal attenuation which can be implemented using digital circuitry which functions within a specified frequency band. An electrical signal generated in response to a reflected ultrasonic wave is applied to a zero crossing detector. The zero crossing detector generates a pulse in response to each zero crossing, and the pulses are applied through a gate means to a counter. To minimize counts of pulses from spurious signals, the gate will not pass pulses until a set first period of time after receipt of the preceding pulse. Further, if a pulse is not received within a second period of time, due to a phase inversion for example, a pulse will be generated and applied to the counter and the timers are then reset. Both the first and second periods of time can be functions of the average frequency being measured. These artificial bounds will insure that the system functions within a specified frequency band as does the phase locked loop system. However, the zero crossing detector and the system in accordance with the invention is more responsive to frequency shifts than is the phased lock loop system.

Accordingly, an object of the invention is an improved method of measuring tissue attenuation of ultrasonic waves using a zero crossing detector.

Another object of the invention is apparatus for measuring the frequency and changes in the frequency of a reflected ultrasonic wave using a zero crossing detector and a system which functions within a specified frequency band.

The invention and objects and features thereof will be more readily apparent from the following detailed description and appended claims when taken with the drawing, in which:

FIG. 1 is a functional block diagram of apparatus in accordance with one embodiment of the invention.

FIG. 2A and FIG. 2B are plots of a reflected ultrasonic wave having spurious zero crossings due to a phase reversal and the effects thereof on the output of a phase lock loop.

FIG. 3A and FIG. 3B are a plots of a reflected ultrasonic wave in which zero crossings are eliminated due to phase reversals in the reflected wave and the effect thereof on a phase lock loop.

Referring now to the drawings, FIG. 1 is a functional block diagram of apparatus in accordance with the present invention. An electrical signal generated by an ultrasonic transducer in response to a reflected ultrasonic wave is applied to the input of a zero crossing detector 10. As described in copending application Ser. No. 369,423 now U.S. Pat. No. 4,441,368, supra, the zero crossing detector is preferably a mono-stable multivibrator having a Schmitt trigger. Such a circuit may be the commercially available TI74221 duel one-shot with Schmitt trigger input. The output of the zero crossing detector 10 is passed through a gate 12 to a counter 14. The counter may be a capacitive charge storage means which develops a charge indicative of the number of pulses passed through the gate 12. The frequency of a reflected ultrasonic wave, and hence the tissue attenuation thereon, is determined by the number of pulses counted per unit of time.

To minimize the count of spurious pulses due to zero crossings resulting from phase inversions and noise, a timer 16 is provided to prevent passage of pulses through gate 12 for a limited period of time after the preceding pulse has passed from gate 12 to the counter 14. The set period of time for the timer 16 is based on the anticipated frequency range of an ultrasonic wave from a given depth within the tissue, and the period of time can be varied since the frequency of an ultrasonic wave will decrease with tissue depth. Alternatively, the set period for timer 16 can be controlled by the average frequency measured as determined by the counter 14. Timer 16 enables gate 12 after the set period of time. Accordingly, pulses at a rate much faster than the anticipated rate will be surpressed.

A second timer 18 is reset by each pulse passed by gate 12, and if a second pulse is not received within a second period of time then timer 18 enables pulse generator 20 to generate a pulse which is applied to gate 12. Thus, the absence of zero crossings due to phase inversion in the reflected ultrasonic wave are compensated by the pulses from generator 20. Again, the period of time for timer 18 can be varied with depth or with the average measured frequency.

FIG. 2 and FIG. 3 further illustrate the problem of spurious signals and the effects thereof on a phase lock loop. In FIG. 2A a reflected ultrasonic wave is indicated at 30 and has zero crossings of 7, 7, 10 and 8 in set intervals. The increased count of 10 is the result of a 180° phase reversal in the signal 30 as indicated. The resulting effect on the output of the phase lock loop system as disclosed in copending application Ser. No. 520,958, supra, is an increased output as shown at 34 and FIG. 2B.

Conversely, FIG. 3A illustrates a reflected ultrasonic wave 40 and the zero crossing count for intervals including an interval with reduced zero crossing count due to a phase reversal. The resulting effect on a phase lock loop is illustrated in FIG. 3B and includes a dip in the output as shown at 44.

The system in accordance with the present invention provides a more uniform output since the increased zero crossing due to the 180° phase reversal will be suppressed. Conversely, the reduction in zero crossings due to the phase reversal is overcome in the present invention by the artificially generated pulse in response to absence of an indicated zero crossing after a set period of time from the preceding pulse indicating a zero crossing.

The apparatus and method in accordance with the present invention insures that the system functions within a specified frequency band by establishing artificial bounds for the counting of pulses indicative of zero crossings. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Apparatus for counting zero crossings of an ultrasonic wave for use in a system for determining characteristics of biological tissue comprising:

means for generating a pulse in response to a zero crossing of a signal, counter means, gate means for applying said pulse to said counter means, first means for inhibiting said gate means for a first period of time after a zero crossing, and second means for generating and applying a pulse to said gate means after a second period of time after a zero crossing, said first means and said second means being reset after each pulse is passed by said gate means.

2. Apparatus for counting zero crossings of an ultrasonic wave for use in a system for determining characteristics of biological tissue comprising:

zero crossing detector means having an input for receiving a wave and an output, said zero crossing detector generating a pulse in response to each zero crossing of said wave and applying said pulse to said output, gate means having an input connected to receive pulses from said zero crossing detector and an output for passing pulses, said gate means having a control terminal for receiving a signal for inhibiting said gate means from passing pulses, counter means connected to said output of said gate means for counting pulses, first timing means responsive to a pulse from said gate means and applying a signal to said control terminal for inhibiting said gate means for a first period of time, pulse generating means interconnected with said input to said gate means for applying a pulse thereto, and second timing means responsive to a pulse from said gate and interconnected to control said pulse generating means whereby a pulse is applied to said input to said gate means after a second period of time, said first timing means and said second timing means being reset by each pulse at said output of said gate means.

3. In an ultrasound imaging system, a method of operating a zero crossing detector and counter within a desired frequency band comprising the steps of:

inhibiting the counting of a pulse for a first period of time after a pulse is counted, and generating a pulse to be counted after a second period of time after a pulse is counted.

4. In an ultrasound imaging system, a method of measuring the average frequency of a reflected ultrasonic wave comprising the steps of (a) providing transducer means for receiving reflected ultrasonic waves and generating an electrical signal in response thereto, (b) generating a pulse in response to each zero crossing of said electrical signal, (c) counting said pulses, (d) inhibiting the counting of a pulse for a first period of time after a pulse is counted, and (e) generating a pulse to be counted after a second period of time after a pulse is counted.

5. The method as defined by claim 4 wherein said first time period and said second time period are varied as a function of depth of reflection.

6. The method as defined by claim 4 wherein said first time period and said second time period are varied as a function of frequency content of the reflected ultrasonic wave.

* * * * *